April 19, 1949.  H. C. LORD  2,467,759
RESILIENT MOUNTING
Filed Jan. 13, 1944  7 Sheets-Sheet 1
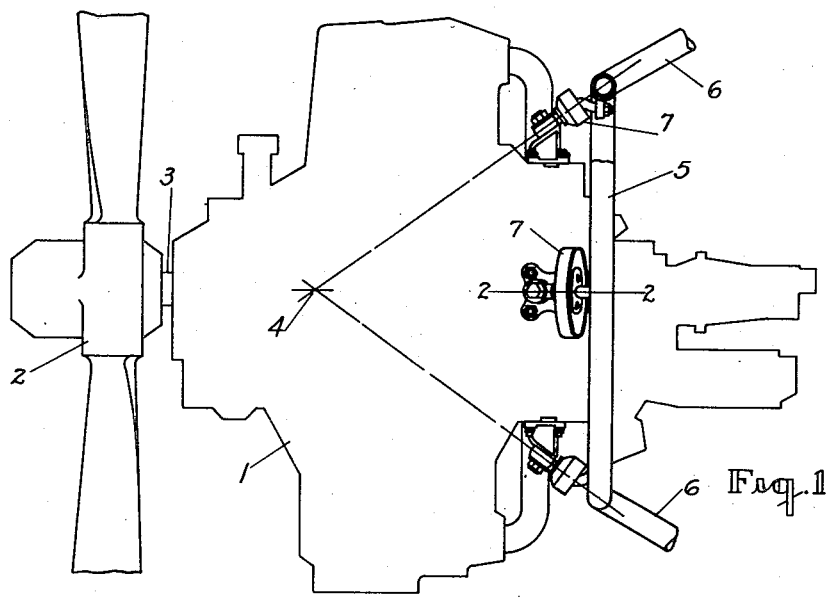
Fig. 1
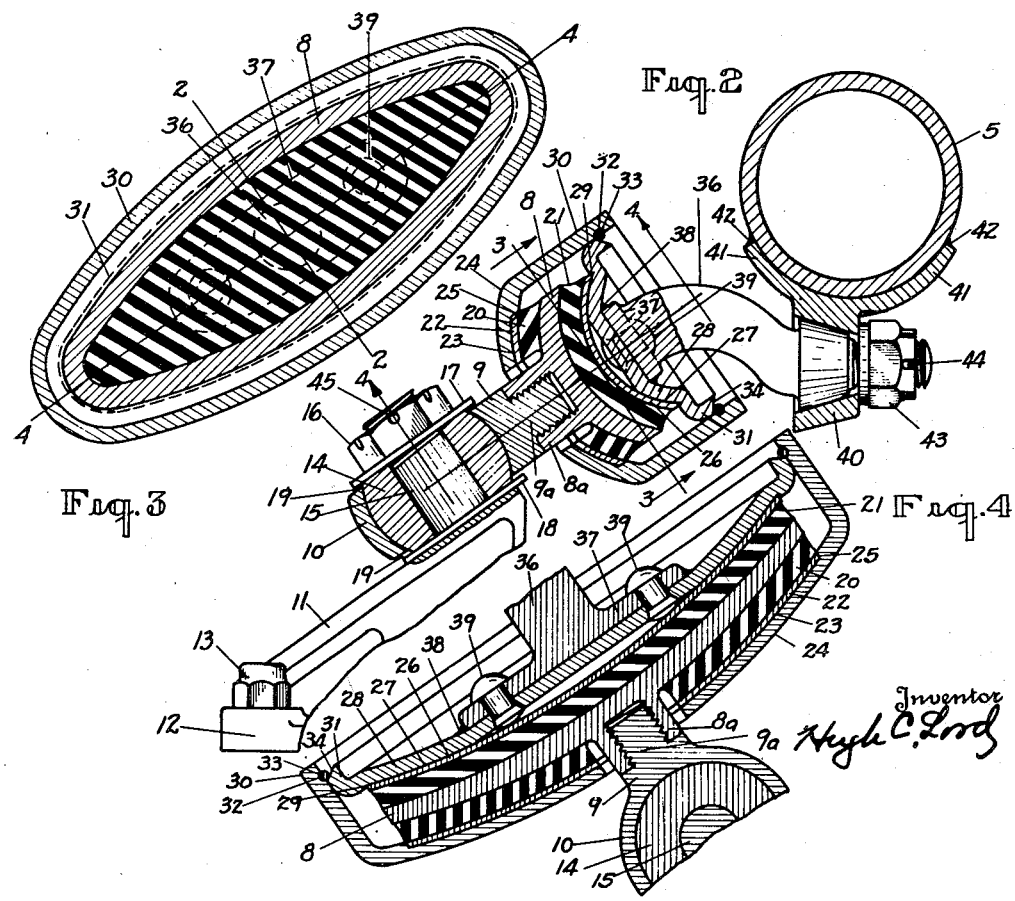
Fig. 2
Fig. 3
Fig. 4
Inventor
Hugh C. Lord

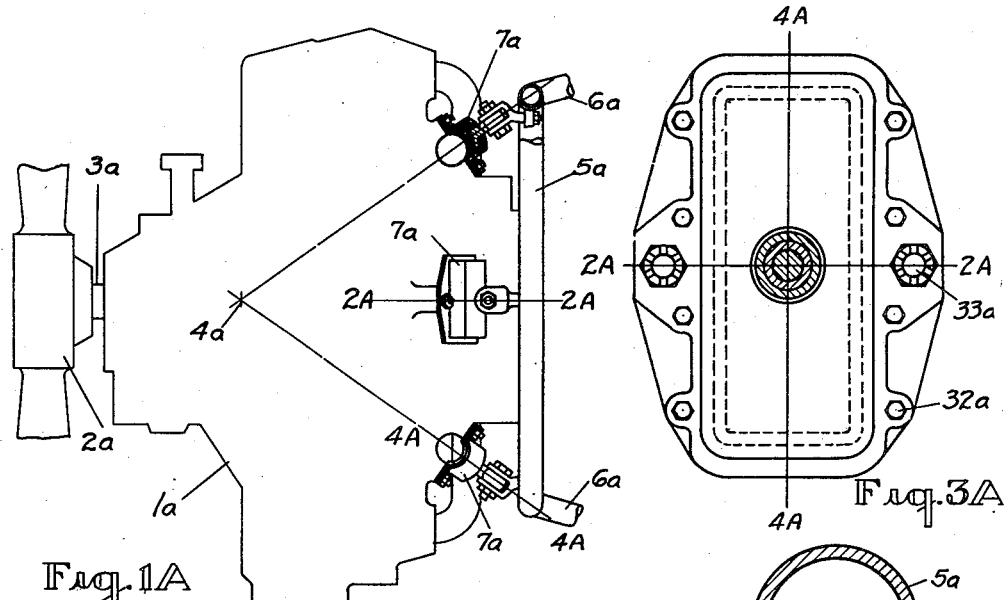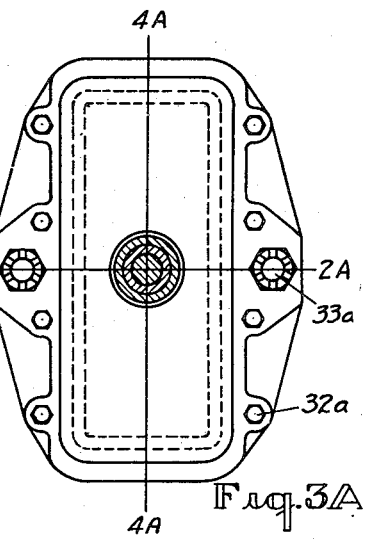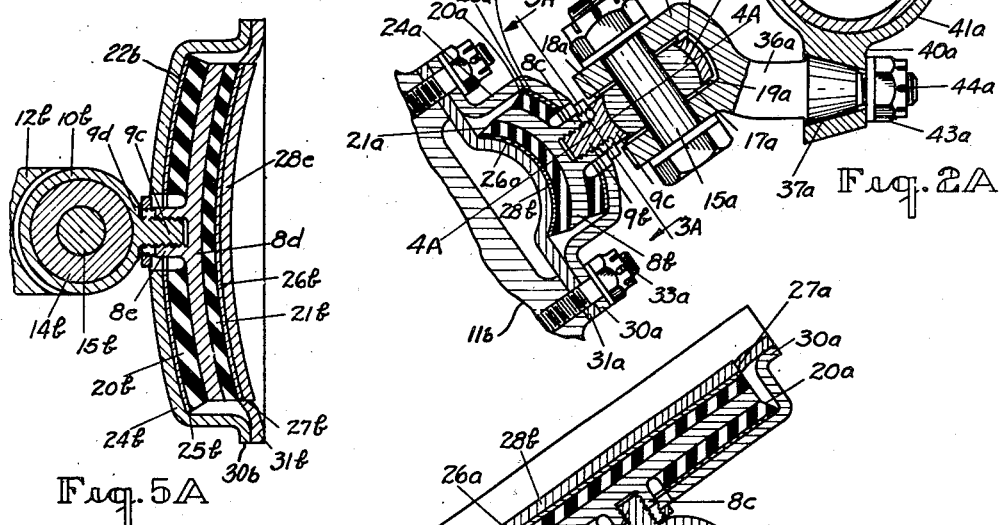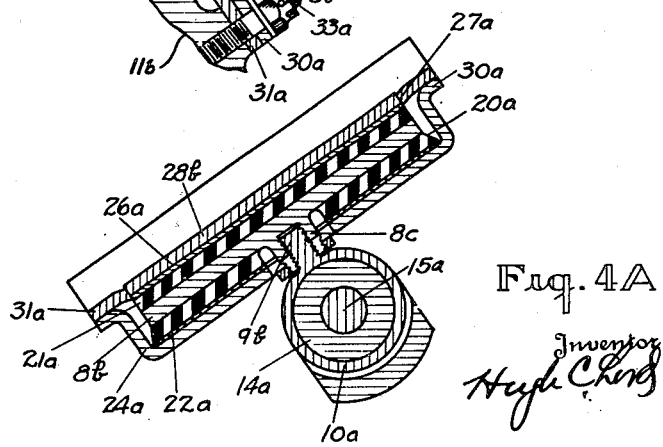

April 19, 1949. H. C. LORD 2,467,759
RESILIENT MOUNTING
Filed Jan. 13, 1944 7 Sheets-Sheet 3
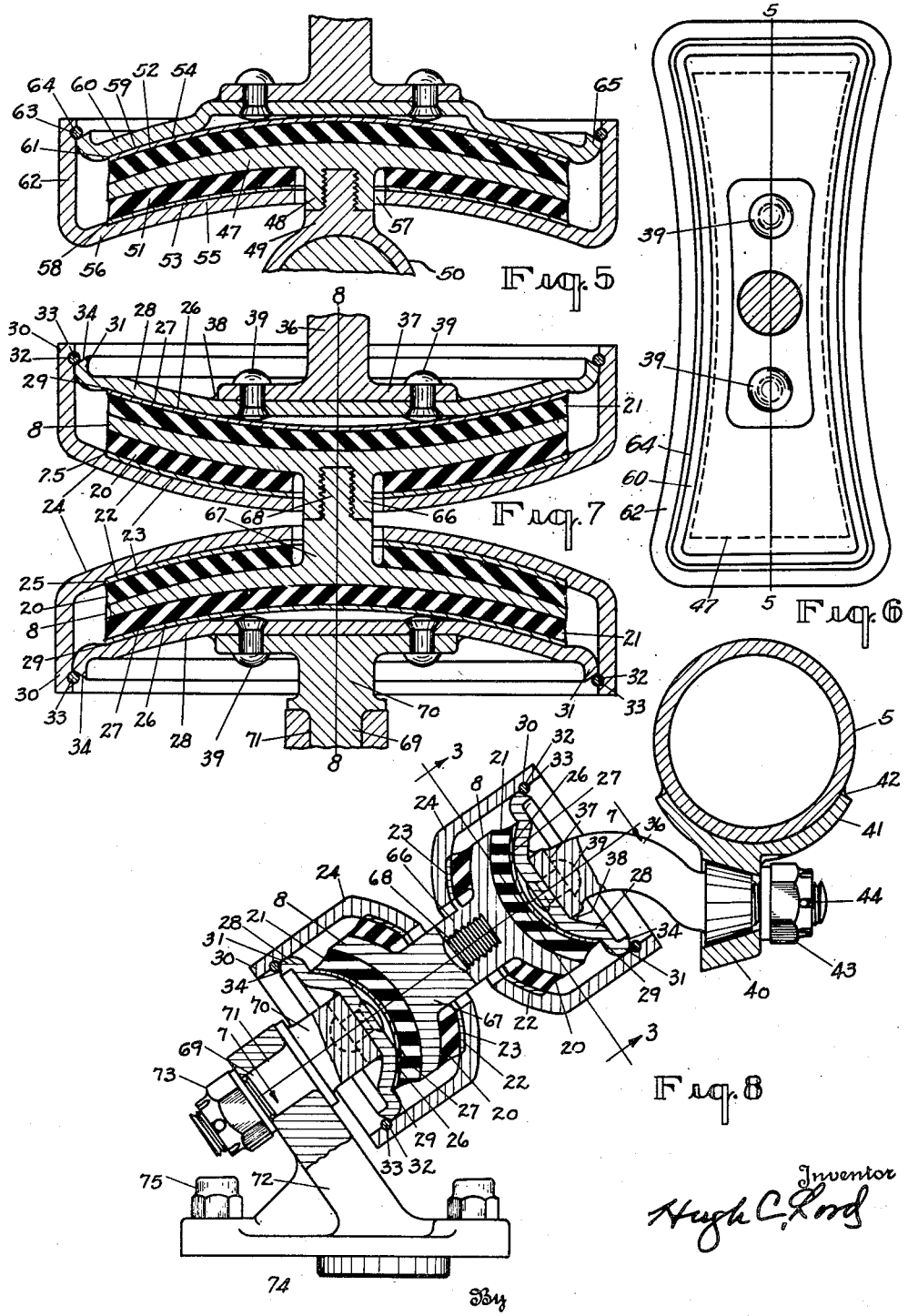
Inventor
Hugh C. Lord April 19, 1949.     H. C. LORD     2,467,759
RESILIENT MOUNTING
Filed Jan. 13, 1944     7 Sheets-Sheet 4
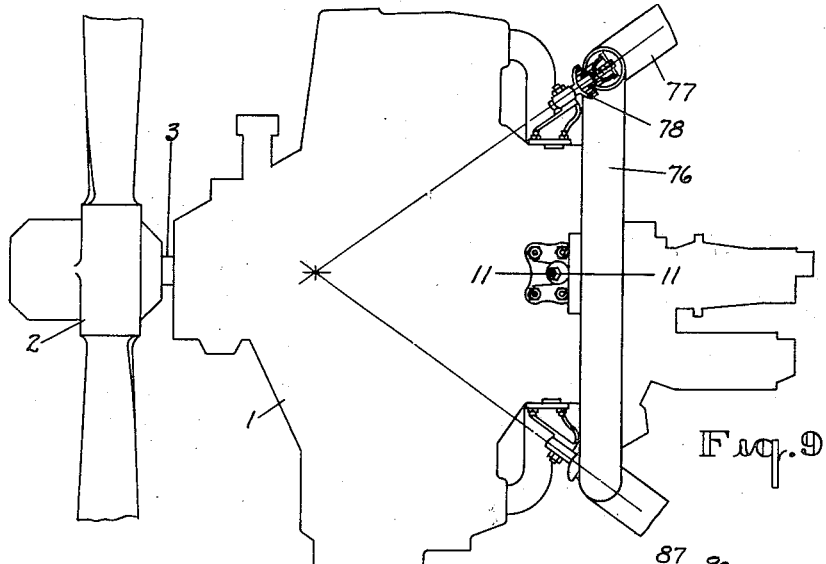
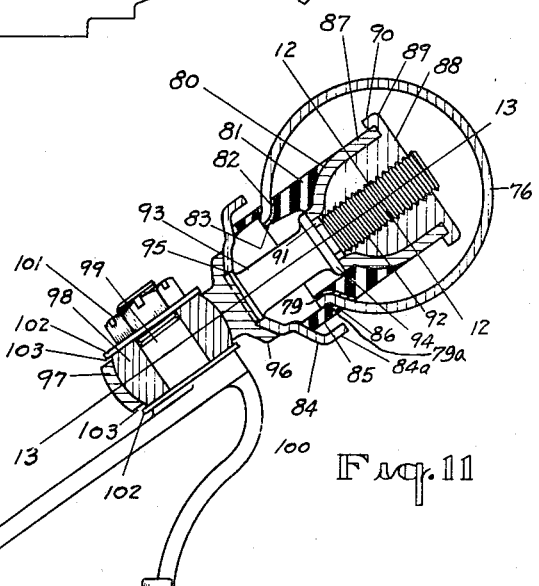
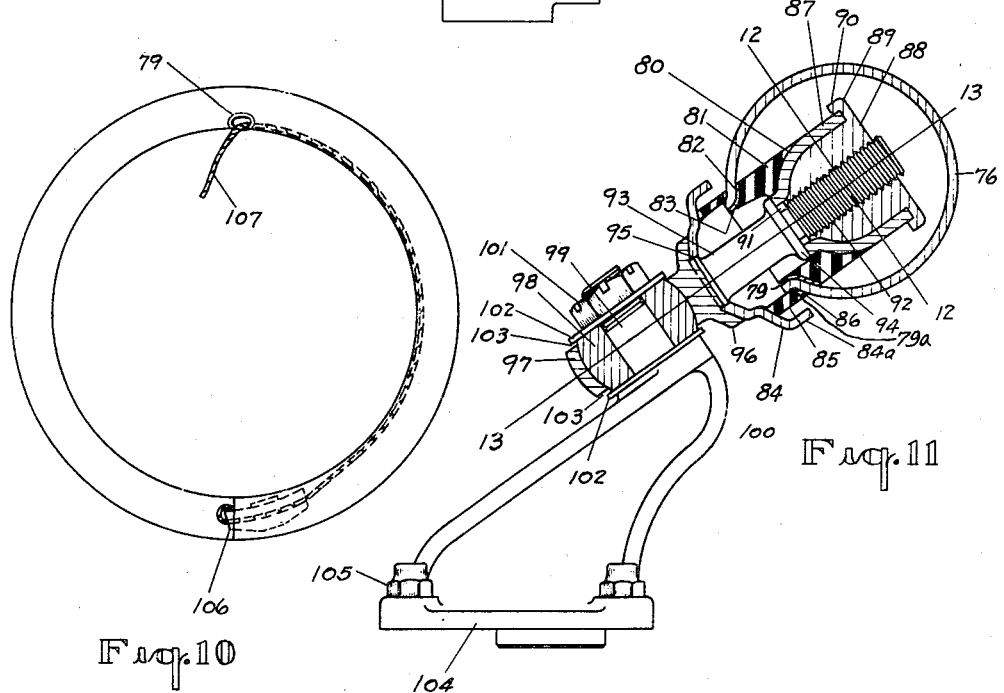

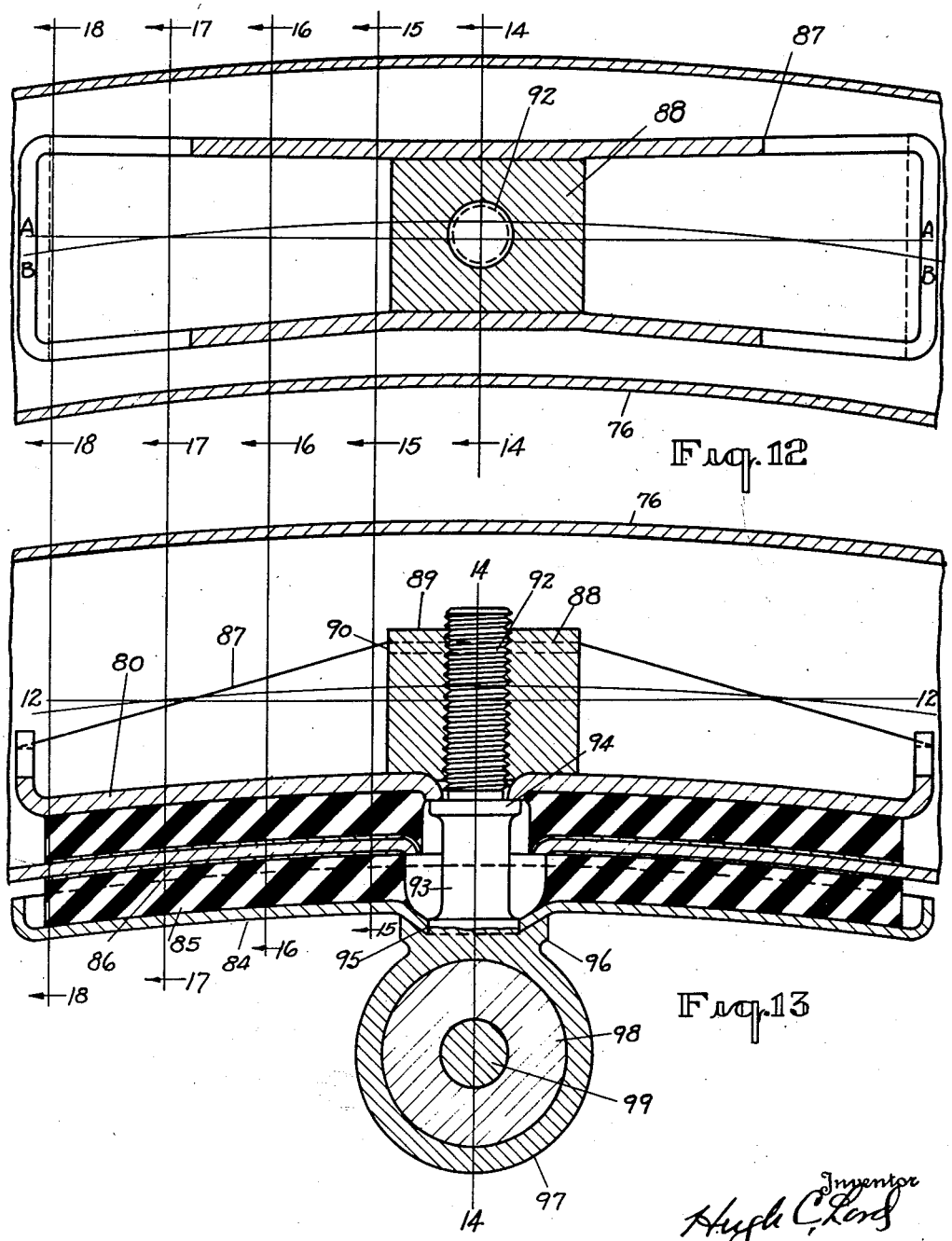

April 19, 1949.   H. C. LORD   2,467,759
RESILIENT MOUNTING
Filed Jan. 13, 1944   7 Sheets-Sheet 6
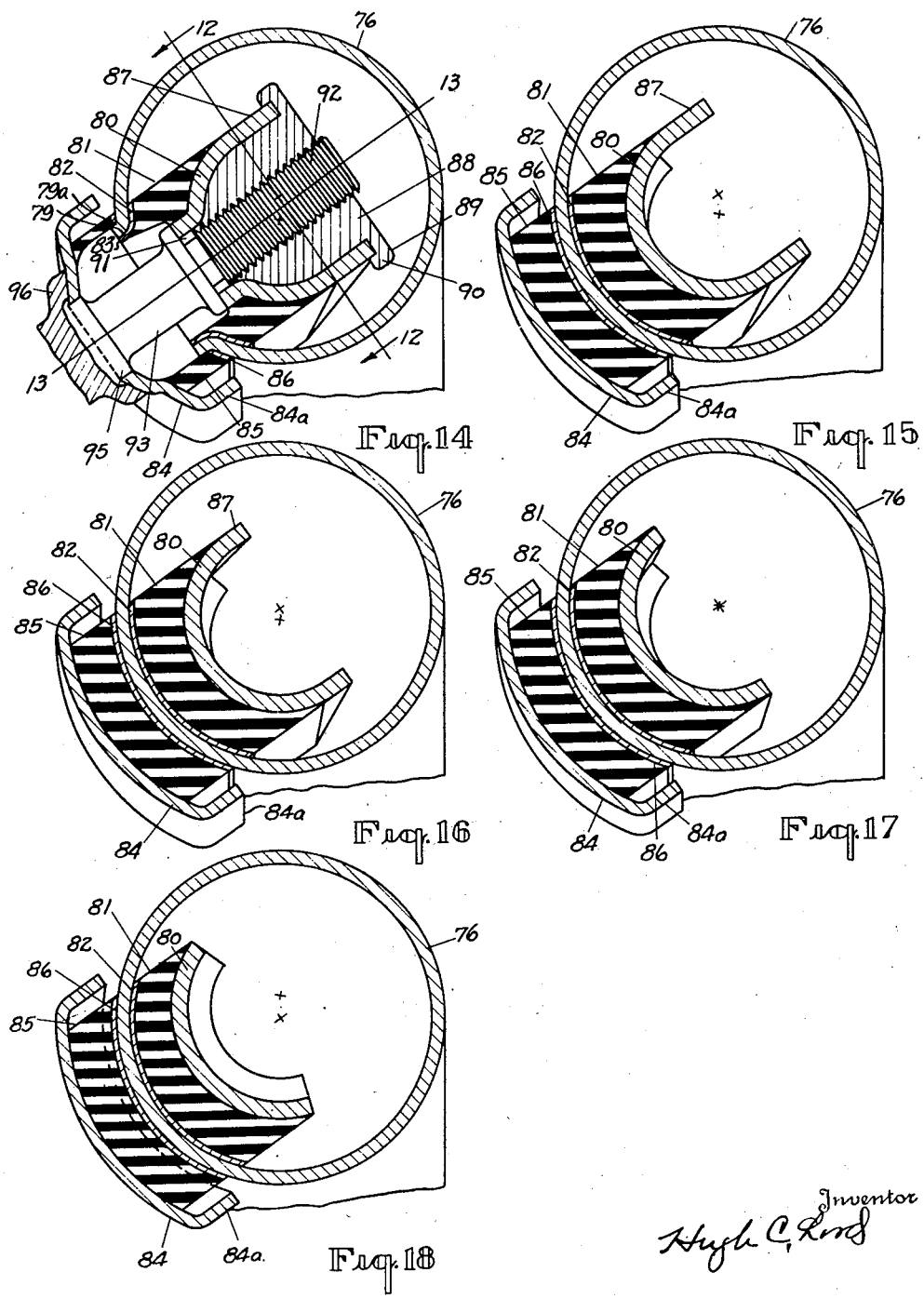

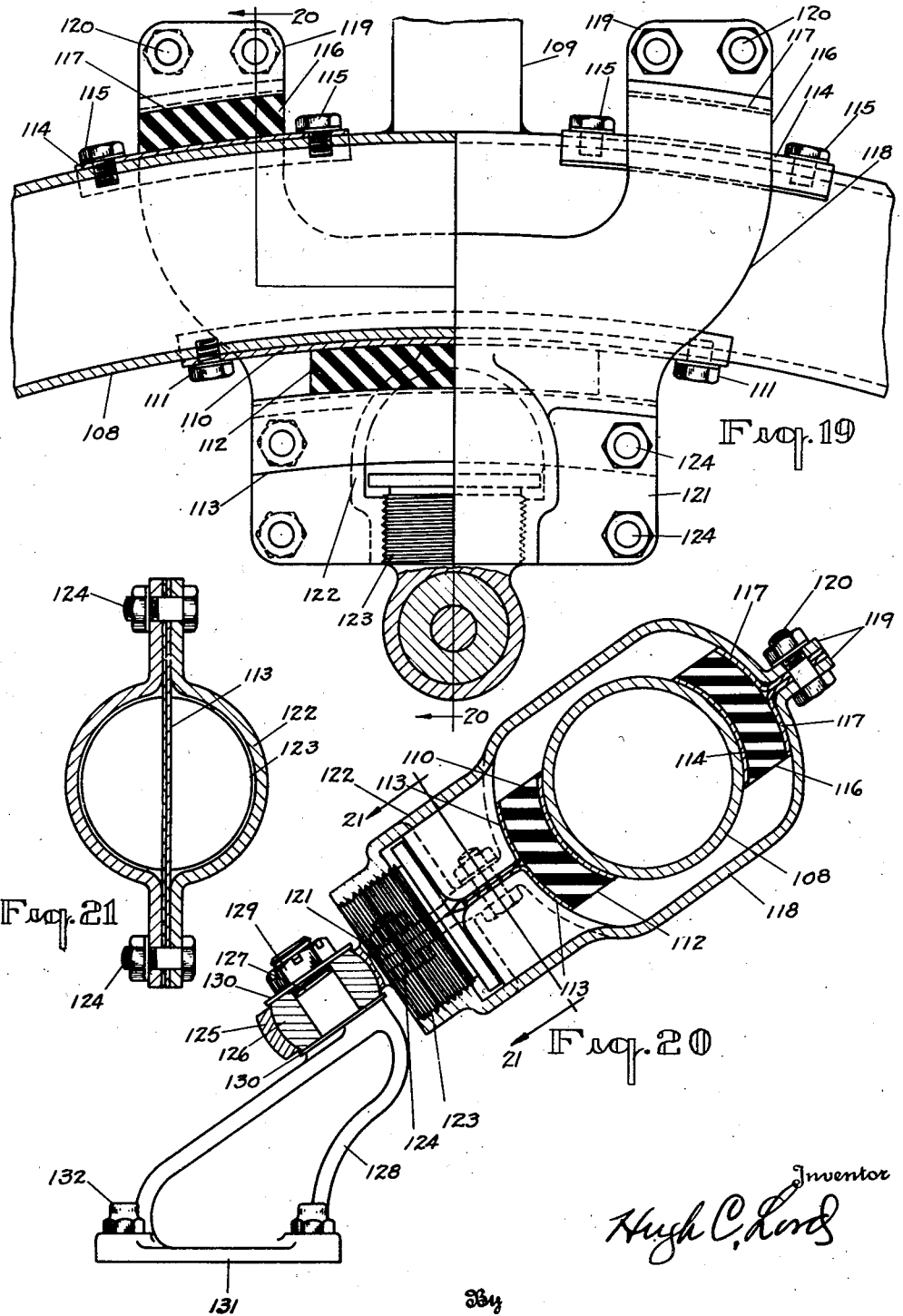

Patented Apr. 19, 1949

2,467,759

UNITED STATES PATENT OFFICE 2,467,759

RESILIENT MOUNTING

Hugh C. Lord, Erie, Pa., assignor to Lord Manufacturing Company, Erie, Pa., a corporation of Pennsylvania Application January 13, 1944, Serial No. 518,042

32 Claims. (Cl. 248—5)

This invention relates to mountings designed for use with vibrating bodies. As exemplified, the mounting is used to support an overhanging airplane engine. With such engines it is desirable to provide a natural period suitable for controlling the torque disturbances and also have the mounting effective as to pitch and yaw forces.

Usually it is desirable to provide a differential in deflection rate of the mounting subjected to torque impulses from the rate subjected to pitch and yaw. The present invention is designed to obtain this result in a simple and effective manner.

This has been accomplished in a broad sense in the patent to Stitz, Reissue No. 21,328, Browne and Taylor, No. 2,175,825, and Lord, No. 2,270,673 supplemented by an invention indicated in Henshaw application, Ser. No. 379,260, filed February 17, 1941, now Patent No. 2,385,759, dated Sept. 25, 1945.

The present invention is of the sandwich type and in that respect is better than Stitz and Browne and Taylor in that all the rubber is uniformly stressed and affords a better load carrying support than do the bushing type mountings used in the Stitz and Browne and Taylor patents.

In my former patent sandwich type mountings are used, and the side walls of the mounting have spherical surfaces so as to permit yielding rocking movement but the resistance to movement in all directions is substantially equal so that in itself it does not give the desirable differential. For this reason the spherical mounting which preceded my patent above referred to is given a differential by providing auxiliary joints, one at least of which is free moving about a constant axis so that the resistance to movement on this axis, being slight, gives the desired differential.

The present invention as exemplified, is of the sandwich type but the opposing surfaces differ in different directions. By giving to the surfaces what may roughly be described as a spoon shape, the curve in the torque direction has a much longer radius than the curve in the cross direction, which provides the greater part of the resistance to the pitch and yaw movement.

The differential may be made more or less by varying the relation between these curves. If the cross curve has a comparatively short radius and one of the core members is rocked on this axis of the curve as a center by a projecting arm or link, the edgewise movement incident to the rocking movement is comparatively slight as a large part of the movement is incidental to the rocking action of the link or arm and consequently the resistance is comparatively slight. If the radius is shortened relatively to the actuating arm, a greater part of the movement of the members is absorbed by the rocking of the arm. As the curve is flattened, the movement more nearly corresponds to the actual movement of the actuating body. This flattening may be continued to a straight line position. If the convex side of the face of the members is toward the arm, the moving members move in the direction of the body. If it is desired to obtain an even greater differential, the curve of the lengthwise direction of the mounting may be reversed so that the concave side is toward the actuating arm in which the movement induced by a movement of the body may be as great or greater than that of the body so as to increase the differential. If greater resistance is desired in both directions of relative movement of the members, both the long and short radii faces may have their concave side facing the actuating arm or link. These differentials and the manner of using the device may be accomplished in a variety of ways, some of which are illustrated in the present application.

The invention also contemplates utilizing a supporting member such as a mounting ring of an airplane as an element in the construction of the mounting. This may be accomplished by placing the features of the mounting on opposite sides of the ring or it may be accomplished by utilizing a wall of the ring and placing one of the mounting sandwiches within the ring and the other sandwich outside the ring, utilizing the wall of the ring as the core of the mounting.

In these cases where the ring is used as a member, the other members are connected and the arm projects from a member and the members are rocked on a shorter radius for accommodating the pitch and yaw and the torque resistance is accommodated by a flatter curve or reverse curve so as to have a definitely greater resistance in torque than in pitch and yaw.

Features and details of the invention will appear from the specification and claims.

Preferred embodiments of the invention are illustrated in the accompanying drawings as follows:

Fig. 1 is an elevation of an engine supported by one modification of mountings involving the present invention.

Fig. 1A is an elevation of an engine supported by a modification differing from the modification of Fig. 1 in that the mounting connections are reversed and also having variations of the structure of the mounting.

Fig. 2A is a section on the line 2A—2A in Figs. 1A and 3A.

Fig. 3A is a section on the line 3A—3A in Fig. 2A.

Fig. 4A is a section on the line 4A—4A in Figs. 1A and 3A.

Fig. 5A is a modification varying from the modification of Figs. 1A to 4A in that the members are curved lengthwise.

Fig. 2 a central section of the mounting on the line 2—2 in Figs. 1 and 3.

Fig. 3 a section on the line 3—3 in Fig. 2.

Fig. 4 a section on the line 4—4 in Figs. 2 and 3, the long way of the mounting in Figs. 1 to 4 being in the direction of the actuating arm or link.

Fig. 5 a central section on the line 5—5 in Fig. 6 of a mounting similar to that of Figs. 1 to 4 except the concave side lengthwise of the mounting is toward the operating arm, the sharper curve cross section of the mounting being similar to the cross section shown in Fig. 3.

Fig. 6 a plan view of the mounting shown in Fig. 5.

Fig. 7 shows a mounting in which the operating arm is actuated through a yielding mounting similar to the mounting illustrated in Figs. 1 to 4.

Fig. 8 is a section of the same mounting on the line 8—8 in Fig. 7.

Fig. 9 is a side elevation of an engine supported by a modified mounting in which a part of the mounting is arranged within the supporting ring and the wall of the ring is utilized as the core for mounting.

Fig. 10 is a view of a ring showing a manner of introducing the members of the mountings to the interior of the ring during the assembly.

Fig. 11 is a section on the line 11—11 in Fig. 9.

Fig. 12 is a section on the line 12—12 in Figs. 11 and 14.

Fig. 13 a section on the line 13—13 in Figs. 11 and 14.

Figs. 14, 15, 16, 17 and 18 are comparative sections on the lines 14—14, 15—15, 16—16, 17—17 and 18—18 in Figs. 12 and 13.

Fig. 19 is a side elevation, partly in section, utilizing the entire ring as a core of the mounting.

Fig. 20 is a section on the line 20—20 in Fig. 19.

Fig. 21 a section on the line 21—21 in Fig. 20.

In the modification, Figs. 1 to 4, 1 marks an engine; 2 a propeller carried by a shaft 3 of the engine; 4 a focal point of movement of the engine, this being adjacent to, but preferably slightly in front of, the center of gravity; 5 a supporting ring for the engine; 6 struts leading to the supporting ring; 7 a series of mountings arranged around the axis of the engine and connecting the engine with the supporting ring.

The mounting has a core 8 which, as shown, may be described as spoon-shaped, the cross curve being of a comparatively short radius. A stem 8a extends from the core and has a screw threaded socket receiving a projection 9a on the arm 9. The arm 9 is provided with a ball receiving ring 10. A pedestal 11 has a base 12 secured to the engine in the usual manner by screws 13. Ball members 14 are mounted on a stud 15 extending from the bracket 11, the stud extending through the ball member. A nut 16 clamps the ball member against the bracket. Washers 17 and 18 are provided for the ball member, these being spaced at 19 from the ring 10 so as to permit a slight movement of the ball member but to limit that movement. The joint thus formed provides universal movement.

An element of resilient material, such as rubber, 20, is bonded to the convex side of the core and a similar element 21 is bonded to the opposite side of the core. A metal plate 22 is bonded to the outer surface of the element 20. It is arranged in a socket 23 in an outer mounting member 24. The walls of the socket form a stop 25 locating the plate 22 so that as the core is rocked, the movement is accommodated by a shear action of the element 20.

A plate 26 is bonded to the outer surface of the element 21. This plate is arranged in a socket 27 in a cover member 28, the walls of the socket forming stops 29 for the plate so that with a rocking of the core, the movement is accommodated by the shear action of the element.

The mounting member 24 has a flange 30 which telescopes a flange 31 extending from the cover member 28. The flange 30 has an annular groove 32 in which is arranged a ring 33 which is formed in two parts, the ends of the ring meeting at the lengthwise center of the mounting. The outer edge of the flange 31 is bevelled.

In assembling the members, the member 28 is pressed inwardly through the resilience of the rubber sufficiently to carry a bevelled edge 34 out of register with the groove 32. With the plate 28 in this depressed position, the ring 33 can be put in place and when the member 28 is released, the bevelled edge engages the ring and locks the member in place, the bevel locking the ring in the groove.

A supporting projection 36 is provided with a head 37 which is secured to the outer face of the cover member 28. This may be accomplished in various ways as by a weld 38 along its edges and by rivets 39 extending through the walls of the head and member 28. The projection 36 extends through a fitting 40 having wings 41 welded at 42 to the supporting ring 5. A nut 43 is arranged on the end of the projection and engages the fitting and locks the projection in the fitting. The nuts 43, as well as the nut 16, are locked by cotter pins 44 and 45 respectively.

In the modification shown in Figs. 1A to 4A, 1a marks an engine; 2a a propeller carried by a shaft 3a of the engine; 4a a focal point of movement of the engine, this being adjacent to, but preferably slightly in front of, the center of gravity; 5a a supporting ring for the engine; 6a struts leading to the supporting ring; 7a a series of mountings arranged around the axis of the engine and connecting the engine with the supporting ring.

The mounting has a core 8b which, as shown in Figs. 3A and 4A, is cylindrical, the cross curve being of a comparatively short radius. A stem 8c extends from the core and has a screw threaded socket receiving a projection 9b on the arm 9c. The arm 9c is provided with a ball receiving ring 10a. Ball members 14a are mounted on a bolt 15a extending through the arms of a fork 12a. The bolt is secured by a nut 16a. Washers 17a and 18a are provided for the ball member, these being spaced at 19a from the ring 10a so as to permit a slight movement of the ball member but to limit that movement. The joint thus formed provides universal movement.

An element of resilient material, such as rubber, 20a, is bonded to the convex side of the core and a similar element 21a is bonded to the opposite side of the core. A metal plate 22a is bonded to the outer surface of the element 20a. It engages the flanged edges of an outer mounting member 24a forming stops 25a for the plate.

A plate 26a is bonded to the outer surface of the element 21a. The ends of this plate engage stabbings 27a and the side edges a corner formed in the member 28b by flanges 31a. The cover member 24a has a flange 30a which seats on the flange 31a. Screws 32a extend through the flanges 30a to the flange 31a and secure the members together. A bolt 33a extends through both flanges into a seat 11b on the engine.

A supporting projection 36a extends from the fork 12a and is provided with a head 37a which extends through a fitting 40a, the fitting 40a having wings 41a welded at 42a on the ring 5a. A nut 43a is arranged at the end of the projection 36a and secures the head 37a in the fitting. The nuts 43a, as well as the nut 16a, are locked by cotter pins 44a and 45a, respectively.

The operation of this mounting is similar to that of Figs. 1 to 4 except that instead of a lengthwise curved form of the member, this shape is straight so that the members are cylindrical. This adds to the differential, making the torque resistance greater than where the members are curved lengthwise as well as crosswise.

In Fig. 5A the structure is practically identical with that of Figs. 1A to 4A except that the members are curved lengthwise and the side flanges are slightly deeper so as to satisfy the curve, the plan view of the structure in Fig. 5A being similar to that shown in Fig. 2 except that the side flanges of member 24b extend downwardly enough to take care of the distance from the inside of the bottom of member 24b to the edge of the flange, the outer flanges 30b being made straight.

In this structure the mounting has a core 8d. A stem 8e extends from the core and has a screw threaded socket receiving a projection 9c on the arm 9d. The arm 9d is provided with a ball receiving ring 10b. Ball members 14b are mounted on a bolt 15b extending through the arm of a fork 12b.

An element of resilient material, such as rubber, 20b, is bonded to the convex side of the core and a similar element 21b is bonded to the opposite side of the core. A metal plate 22b is bonded to the outer surface of the element 20b.

A plate 26b is bonded to the outer surface of the element 21b. Plate 22b engages the flanged edges of an outer mounting member 24b forming stops 25b for the plate. The ends of plate 26b engage stabbings 27b and the side edges a corner formed in the member 28e by flanges 31b. The mounting member 24b has a flange 30b which seats on a flange 31b.

In this variation the members are secured together by screws and are secured to the seats on the engine in exactly the same manner as in Figs. 1A to 4A. This variation, however, reduces the differential between the torque and pitch and yaw disturbances.

In the modification shown in Figs. 5 and 6, the center of the crosswise curve in Fig. 6 provides a short radius and the center for the lengthwise curve in Fig. 5 provides a long radius. In this structure 47 marks a core. This has a stem 48 in which an arm 49 is secured. The ring 50, corresponding to the ring 10, is arranged on the arm, and the completion of the ball joint is similar to that shown in Fig. 2. An element 51 is bonded to one side of the core 47 and an element 52 is bonded to the opposite side of the core. A plate 53 is bonded to the outer surface of the element 51 and a plate 54 to the outer surface of the element 52. The plate 53 is arranged in a socket 55 in a cover member 56, the cover member having an opening 57 through which the stem 48 extends permitting vibratory movement relatively to the cover member.

The wall of the socket forms a stop 58 for the plate 53. The plate 54 is arranged in a socket 59 in a cover member 60, and the end of the socket forms a stop 61 for the plate. A flange 62 extends upwardly from the member 56. It is provided with an annular groove 63 in which a ring 64 is placed. The member 60 has a flange 65, the upper edge of which is bevelled. By compressing the rubber, this edge may be brought downwardly to expose the groove for the introduction of the ring. As the elements spring back, the edge engages the ring and is locked in place thereby and the bevel prevents the escape of the ring. This structure differs in its function in that the stem must be radial to the curve so that as the engine moves, the core moves farther than the engine, thus increasing the resistance and the differential.

In Figs. 7 and 8, a member exactly similar to that of Fig. 4 is utilized and connected with the ring in the same manner. A similar member is substituted for the ball joint. The core in this structure has an extension 66 with a screw threaded opening which receives a projection 68 on a stem 67 projecting from the core of the other member. Otherwise this structure corresponds to that of Fig. 3 except that it is inverted.

A projection 69 having a head 70 is secured to the cover member 28 in the manner shown in Fig. 3. The projection 69 extends through an opening 71 in a bracket 72 and is secured by a nut 73. The bracket has a base 74 and is secured to the engine by studs 75 in the usual manner.

In the modification shown in Figs. 9 to 18, the same engine is shown as in Fig. 1 and the same reference numerals used to designate the several parts. The engine is supported by a ring 76 carried by struts 77. Mountings 78 extend from the ring to the engine. These are arranged about the axis and arranged with relation to the focal point to permit of torque movements and also pitch and yaw movements of the engine about this focal point. The ring is supplied with a series of openings 79, one for each mounting.

The mounting has opposing yielding elements inside and outside of the ring utilizing the ring itself as a core for the mounting. A backing member or plate 80 is arranged within the ring. This backing member is curved with a comparatively short radius crosswise of the plate and curved following somewhat the contour of the wall of the mounting ring 76 lengthwise so that the structure involves the short radius rocking possibility crosswise of this member 80 and the elongated radius curve lengthwise, the elongated curve being slightly in reverse as indicated in the structure of Figs. 5 and 6.

A yielding member 81 of rubber or the like material is bonded to the member 80 and also has a plate 82 bonded to its outer surface. The plate 82 has an opening corresponding to the opening 79 and is provided with a flange 83 which extends into the opening 79.

An outer backing member 84 is arranged outside of the ring 76 and opposite the member 80. A resilient element 85 is bonded to the backing member 84. A plate 86 is bonded to the inner surface of the element 85, and engages the outer surface of the supporting ring 76. Plate 86 has an opening with its edge engaging the outer wall 79a of the opening 79. The member 84 has a surrounding flange 84a to strengthen it.

The member 80 has a surrounding flange 87. This flange is quite deep at the center. A nut 88 is arranged in the channel formed by the member 80 and its flange, and this nut fits the wall of this member so as to be definitely engaged thereby. The nut has extending flanges 89 with lips 90 which extend over the edge and downwardly over the outside face of the flanges 87 so as to strengthen the engagement.

The member 80 has an opening 91 through which a screw threaded projection or stem 92 extends, the screw threads extending into a screw threaded opening in the nut. The stem has a projecting arm or link 93 on which there is a shoulder 94 engaging the edge of the opening 91, the opening having a surrounding flange. The projection extends through an opening 95 in the backing member 84 and is provided with a head 96 engaging the backing member. A ball joint ring 97 is formed on the end of the projection 93 and operates on a ball member 98. The ball member is mounted on a post 99 extending from a bracket 100. The ball member is secured on the post by a nut 101. Stop washers 102 are arranged each side of the ball member and provide a space 103 to permit movement of the ring 97, the stop washers limiting this movement as desired.

The bracket 100 has the usual base 104 and is secured to the engine by bolts 105 in the usual manner. The members 80 and 84 follow the general contour of the supporting ring. The rocking axis crosswise A—A (Fig. 12) crosses the center line B—B so that the area in each direction from the stem is equalized so that there is no cocking action on the stem. The cross surface of the plates 80, 84 with relation to the rocking axis is a compromise with relation to the curve to the supporting ring, the wall of which forms the core of the mounting. This compromise as to the contour of the surface is indicated in Figs. 14 to 18 which represent sections 14—14 to 18—18 in Figs. 12 and 13. The rocking axis corresponds to the centering of the ring in the section 17—17. Other than this the surface or contour of the backing member is slightly off center, the yielding of the rubber readily taking care of any variation from an exact curvature corresponding to the ring curvature so that a free cross rocking action is provided. The curvatures of the supporting ring, where used as in this structure, impose those curvatures on the structure as a whole, but the sides of the ring give a definitely flatter curvature than the cross curvature so that there is a very definite differential provided.

In order to assemble the mountings within the ring, the ends of the ring are not united at one side 106 and are offset sufficiently to permit the entrance of the inner portions of the mounting. These are drawn to place by a cord 107 which is introduced through the top opening. The mountings one by one may be drawn to place in this manner and then the ends of the supporting ring closed and welded. A removable covered opening, not shown, may be utilized for introduction of the members instead of the parting of the ring as shown, if desired.

The operation is similar to that shown in Figs. 5 and 6. The reverse curvature is very slight for the reason that the axis of the mounting as it extends to the focal point is about thirty-five degrees from the engine axis. If the axis of the mounting were parallel to the engine axis, the long way of the mounting would be, so far as the rocking action is concerned, equivalent to being substantially straight. The angle of the mounting extending as it does toward the focal point, brings the mounting near enough to this substantially flat condition so that the reverse effect in increasing the torque resistance is not very great and thus provides for a satisfactory differential in resistance to torque movement and the pitch and yaw movements which are accommodated to a greater extent by the cross rocking of the mounting.

The differential may be also influenced by changing the length of the arm or link 93 which alters the resistance to the crosswise rocking relatively a great deal more than it does the lengthwise resistance or resistance to torque.

In the modification shown in Figs. 19 and 20, 108 marks a supporting ring which is similar to the supporting rings heretofore shown, and 109 one of the struts. It will be understood that these are arranged around the axis of the engine and that a series of them are arranged around the engine as in Figs. 1 and 9.

There are three sandwich type mountings involved in each unit. One on the inside of the ring comprises an inside plate 110 which has extensions through which screws 111 are passed to secure it to the inside of the ring. A rubber element 112 is bonded to the plate 110 and an outside plate 113 is bonded to the outer surface. This outer plate is T-shaped. Two sandwiches are arranged on the outside of the ring, each of them having plates 114 on their inner periphery which are secured to the ring by screws 115. Resilient elements 116 are preferably bonded to the plates 114 and have plates 117 bonded to their outer periphery. The plates 117 are preferably T-shaped. A connecting fixture 118 is Y-shaped, the two arms engaging the outer mounting units and the central part of the fitting engaging the inner unit. The inner unit has preferably the same area as the combined outer units. The fixture is made in two halves, providing ears 119 which are brought together at each side of the web of the plate 117 and are secured together by bolts 120. These bands are brought around the ring and around the inner resilient unit and are provided with ears 121 which engage the web of the plate 113.

Each side of the fixture has its wall pressed to form a semi-circular opening 122 which, when the two parts are brought together, forms a complete opening. The web of the plate 113 strengthens that plate and extends across this opening and between the ears at each side of the opening. The wall of the opening 122 is screw threaded and a screw threaded arm or stud 123 is arranged in this opening so that when the two parts of the fixtures are clamped together by bolts 124, the threads engage and lock the threads together. This manner affords an adjustment so as to take up any inaccuracy of the ring.

The stud carries a ball ring 125 which operates on a ball member 126. The ball member is carried by a post 127 extending from a bracket 128. The ball member is secured by a nut 129. Stop washers 130 are arranged at each side of the ball member and spaced slightly from the ring forming stops with relation to the ring but permitting a limited movement. The bracket has the usual base 131 which is secured to the engine by studs 132 in the usual manner.

It will be noted that the rocking axis of the mounting units (similar to A—A in Fig. 12) extends slightly nearer the inner wall of the ring at a point opposite the unit at the inside of the ring and extends lengthwise of the ring a sufficient distance so that it is similarly spaced from the outer wall of the ring at points opposite the units at the outside so that the rocking movement can be comparatively uniform at these points. The walls of the securing fixture are practically circular with relation to this axis and the rubber elements which conform to the outer wall of the ring are near enough circular so that a crosswise rocking movement is accomplished through the swinging of the projecting stud or arm. This rocking movement of the arm or stud provides a smaller relative movement of the walls of the mounting units than the actual movement of the engine at the connection with the studs whereas the lengthwise movement due to the curve which in this instance is a reverse curve, gets slightly in excess of the full movement of the engine. Thus a very definite differential is established and the ratio of this differential may be varied somewhat by varying the length of the arm or stud.

It will be noted that in this structure the advantages of the sandwich type mounting are retained in that practically all of the rubber is nearly equally stressed both for load and for resisting vibration, and is therefore better in this respect than the Stitz or Browne and Taylor structures.

It will also be noted that practically any differential may be attained, the possibilities of this being at least equal to, and in most cases greater than, either Stitz or Browne and Taylor, and that the differential is attained in a simpler manner than with Lord or as indicated in the Henshaw application in that the rubber joint itself not only provides in the most desirable manner the load carrying and resistance characteristics of the sandwich mount, but also provides largely within itself an almost unlimited range of differential as to deflection rates in different directions, as, for example, in an engine suspension one resistance for the torque and a different resistance for the pitch and yaw, and that these may be readily related to other characteristics that may be desirable.

What I claim as new is:

1. A sandwich mounting having connected outer members and an intermediate member having opposing curved faces of substantially similar contour and more sharply curved in one direction than in a crosswise direction, elements of resilient material such as rubber between the intermediate member and the outer members, means extending laterally from a member subjected to movements effecting relative rocking of the intermediate member with relation to the other members in said one direction and in a crosswise direction, the rocking movement by the means effecting less relative edgewise movement of the members in said one direction than is effected by the same movement of the means in said other direction.

2. A sandwich mounting having spaced opposing members with curved opposing faces, an element of resilient material such as rubber between the faces, the curved faces and interposed element permitting a rocking movement of the members in two directions, the major portions of the faces of the element facing in opposed alined directions normal to the general contour of the faces, and means subjecting one of the members to movement effecting relative rocking of the members in two directions about axes laterally displaced from the members, the curve of the faces controlling the movement in one direction being sharper than the curved faces in another direction whereby the resistance of the element moved by the means in one direction differs from the extent of movement effected by the means in another direction.

3. A sandwich mounting having spaced opposing members with curved faces, the curves of the faces being developed and merged from cross axes, the radii from the curves developed from one axis being greater than the radii of the curves developed from the other axis, an element of resilient material such as rubber between the faces, the major portions of the faces of the element facing in opposed alined directions normal to the general contour of the faces, and means subjected to movement in directions about and transverse to the respective axes, said means being connected to and actuating one of the members, the relative edgewise movement of the members in response to an equal movement of the means in different directions differing in extent with a consequent difference in resistance to such movements by the elements.

4. A sandwich mounting having spaced members with opposing curved faces, the curves of the faces being developed and merged from cross axes, the radii from the curves developed from one axis being greater than the radii of the curves developed from the other axis, both axes being offset from the same side of the members, an element of resilient material such as rubber between the faces, and means subjected to movement in directions about and transverse to the respective axes, said means being connected to and actuating one of the members, the relative edgewise movement of the members in response to an equal movement of the means in different directions differing in extent with a consequent difference in resistance to such movements by the elements.

5. A sandwich mounting having spaced members with opposing curved faces, the curves of the faces being developed and merged from cross axes, the radii from the curves developed from one axis being greater than the radii of the curves developed from the other axis, an element of resilient material such as rubber between the faces, and means subjected to movement in directions about and transverse to the respective axes, said means being connected to and actuating one of the members, both axes being offset from the same side of the members and opposite the means, the relative edgewise movement of the members in response to an equal movement of the means in different directions differing in extent with a consequent difference in resistance to such movement by the elements.

6. A sandwich mounting having spaced members with opposing curved faces, the curves of the faces being developed and merged from cross axes, the radii from the curves developed from one axis being greater than the radii of the curves developed from the other axis, one axis being on one side and the other axis being at the opposite side of the members, an element of resilient material such as rubber between the faces, and means subjected to movement in directions about and transverse to the respective axes, said means being connected to and actuating one of the members, the relative edgewise movement of the members in response to an equal movement of the means in different directions differing in extent with a consequent difference in resistance to such movements by the elements.

7. In a mounting assembly, the combination with a supporting ring of sandwich type mounting units on the ring comprising members facing and spaced from the wall of the ring, elements of resilient material such as rubber in the spaces between the wall and the members, the elements having surface contours approximating the contours of the wall, the major portions of the faces of the element facing in opposed alined directions normal to the general contour of the faces, and means, subjected to motion, connected with and rocking the members.

8. In a mounting assembly, the combination with a supporting ring of sandwich type mounting units on the ring comprising members facing and spaced from the wall of the ring, elements of resilient material such as rubber in the spaces between the wall and the members, the elements having surface contours approximating the contours of the wall, said elements having surface plates secured thereto and engaging the faces of the wall, and means, subjected to motion, connected with and rocking the members.

9. In a mounting assembly, the combination with a hollow supporting ring of a mounting on the ring comprising members facing and spaced from the wall of the ring, said members being oppositely placed, one within and the other outside of the ring, elements of resilient material such as rubber in the spaces between the wall and the members, and means, subjected to motion, connected with and rocking the members.

10. In a mounting assembly, the combination with a hollow supporting ring of a mounting on the ring comprising members facing and spaced from the wall of the ring, said members being oppositely placed, one within and the other outside of the ring, elements of resilient material such as rubber in the spaces between the wall and the members, the elements having surface contours approximating the contours of the wall, and means, subjected to motion, connected with and rocking the members.

11. In a mounting assembly, the combination with a hollow supporting ring of a mounting on the ring comprising members facing and spaced from the wall of the ring, said members being oppositely placed, one within and the other outside of the ring, elements of resilient material such as rubber in the spaces between the wall and the members, the elements having surface contours approximating the contours of the wall, said elements having surface plates secured thereto and engaging the faces of the wall, and means, subjected to motion, connected with and rocking the members.

12. A mounting assembly comprising a ring, a sandwich type mounting on the ring comprising members spaced from opposite faces of the ring, means connecting the members, elements of resilient material such as rubber in the spaces and approximating the contour of the faces of the ring, the ring forming the core of the mounting, the major portions of the faces of the element facing in opposed alined directions normal to the general contour of the faces, and means, subjected to movement, acting on said members moving them relatively to the ring.

13. A mounting assembly comprising a supporting ring, a pair of spaced sandwich type mountings at one side of the ring and a sandwich type mounting at the opposite side of the ring, said mountings comprising members spaced from the ring, means connecting the members, elements of resilient material such as rubber in the spaces, and means, subjected to movement, acting on said members moving them relatively to the ring crosswise and circumferentially.

14. In a mounting assembly a vibratory body; a mounting means attached thereto for supporting the body comprising converging links, one end at least of each link being cushioned in a sandwich mounting having an element of resilient material such as rubber operating between joint members having opposing faces transverse to the link, the contour of the faces of the element in curvature or extent and the action of the link with relation to the members effecting a greater rocking movement of the members with a given movement of the link in one direction edgewise of the members over that given with a similar movement of the link in another direction edgewise of the members, the major portion of the material in action being preponderantly subjected to direct stress by thrusts lengthwise of the link.

15. In a mounting assembly a vibratory body; a mounting means attached thereto for supporting the body comprising converging links, one end at least of each link being cushioned in a sandwich mounting having an element of resilient material such as rubber operating between relatively movable units transverse to the link, one comprising an intermediate member and the other unit outer members, one at each side of and spaced from the intermediate member, said elements having substantially the same surface contours in the spaces between the members, and the link being subjected to movement actuating the units relatively to each other, the relation between the curvature or extent of the surfaces of the elements and the link giving a greater rocking relative movement of the members with a given movement of the link edgewise of the members in one direction than the same extent of movement of the link in another direction edgewise of the members, the major portion of the element in action being preponderantly subjected to direct stress by thrusts lengthwise of the link.

16. In a mounting assembly a vibratory body; a mounting means attached thereto for supporting the body comprising converging links, one end at least of each link being cushioned in a sandwich mounting having an element of resilient material such as rubber operating between connected outer members and an intermediate member, said members having opposed curved faces of substantially similar contour transverse to the link and being more sharply curved in one direction edgewise of the surfaces than in another direction edgewise of the surfaces, the link extending from one of the members and being subjected to movement relatively rocking the members with movement of the link in said one direction and relatively moving the members edgewise by movement of the link in said other direction, the rocking movement by the link effecting less relative movement of the members than is effected by the same movement of the link in another direction, the major portion of the element in action being preponderantly subjected to direct stress by thrusts lengthwise of the link.

17. In a mounting assembly a vibratory body; a mounting means attached thereto for supporting the body comprising converging links, one end at least of each link being cushioned in a sandwich mounting having an element of resilient material such as rubber operating between spaced opposing members with curved opposing faces transverse to the link, the curved faces and interposed element permitting a rocking movement of the members in two directions through the action of the link, the curve of the faces controlling the movement in one direction being sharper than the curved faces in another direction whereby the resistance of the element moved by the link in one direction differs from the extent of movement effected by an equal movement of the link in another direction, the major portion of the element in action being preponderantly subjected to direct stress by thrusts lengthwise of the link.

18. In a mounting assembly a vibratory body; a mounting means attached thereto for supporting the body comprising converging links, one end at least of each link being cushioned in a sandwich mounting having an element of resilient material such as rubber operating between members with curved faces transverse to the links, the curves of the faces being developed and merged from cross axes, the radii from the curves developed from one axis being greater than the radii of the curves developed from the other axis, the link acting with said members effecting a relative edgewise movement of the members, the movement of the members in response to equal movements of the link in different directions differing in extent and with a consequent difference in resistance to such movements, the major portion of the element in action being preponderantly subjected to direct stress by thrusts lengthwise of the link.

19. In a mounting assembly a vibratory body; a mounting means attached thereto for supporting the body comprising converging links, one end at least of each link being cushioned in a sandwich mounting having an element of resilient material such as rubber operating between members with curved faces transverse to the link, the curves of the faces being developed and merged from cross axes, the radii from the curves developed from one axis being greater than the radii of the curves developed from the other axis, both axes being offset from the same side of the members, the link acting with said members effecting a relative edgewise movement of the members, the movement of the members in response to equal movements of the link in different directions differing in extent and with a consequent difference in resistance to such movements.

20. In a mounting assembly a vibratory body adapted for overhung suspension on an upright support; a suspension attached to the body for supporting the body in overhung relation to such a support comprising a series of three or more links horizontally and vertically spaced converging toward each other, one end at least of each link being cushioned in a sandwich mounting having an element of resilient material such as rubber operating between joint members having opposing faces transverse to the link, the contour of the faces of the element in curvature or extent and the action of the link with relation to the members effecting a greater relative edgewise movement of the members with a given movement of the link in one direction over that given with a similar movement of the link in another direction, the links being related to control and accommodate the angular and torsional vibratory movements of the body, the torque movements moving the members in a direction giving the greater relative edgewise movement, the major portion of the element in action being preponderantly subjected to direct stress by thrusts lengthwise of the link.

21. In a mounting assembly a vibratory body adapted for overhung suspension on an upright support; a suspension attached to the body for supporting the body in overhung relation to such a support comprising a series of three or more links horizontally and vertically spaced converging toward each other, one end at least of each link being cushioned in a sandwich mounting having an element of resilient material such as rubber operating between relatively movable units transverse to the link, one comprising an intermediate member and the other unit outer members, one at each side of and spaced from the intermediate member, said elements having substantially the same surface contours in the spaces between the members, and the link being subjected to movement actuating the units relatively to each other, the relation between the surfaces of the elements in curvature or extent and the link giving a greater edgewise relative movement of the members in one direction than the same extent of movement of the link in another direction, the links being related to control and accommodate the angular and torsional vibratory movements of the body, the torque movements moving the members in a direction giving the greater relative edgewise movement, the major portion of the element in action being preponderantly subjected to direct stress by thrusts lengthwise of the link.

22. In a mounting assembly a vibratory body adapted for overhung suspension on an upright support; a suspension attached to the body for supporting the body in overhung relation to such a support comprising a series of three or more links horizontally and vertically spaced converging toward each other, one end at least of each link being cushioned in a sandwich mounting having an element of resilient material such as rubber operating between connecting outer members and an intermediate member, said members having opposed curved faces transverse to the link of substantially similar contour and being more sharply curved in one edgewise direction than in another edgewise direction, the link extending from one of the members and relatively rocking the members with movement of the link in said one direction and relatively moving the members by movement of the link in said other direction, the rocking movement by the link effecting less relative edgewise movement of the members than is effected by the same movement of the link in another direction, the links being related to control and accommodate the angular and torsional vibratory movements of the body, the torque movements moving the members in a direction giving the greater relative edgewise movement, the major portion of the element in action being preponderantly subjected to direct stress by thrusts lengthwise of the link.

23. In a mounting assembly a vibratory body adapted for overhung suspension on an upright support; a suspension attached to the body for supporting the body in overhung relation to such a support comprising a series of three or more links horizontally and vertically spaced converging toward each other, one end at least of each link being cushioned in a sandwich mounting having an element of resilient material such as rubber operating between spaced opposing members with curved opposing faces crosswise of the link, the curved faces and interposed element permitting a rocking movement of the members in two directions through the action of the link, the curve of the faces controlling the movement in one direction being sharper than the curved faces in another direction whereby the resistance of the element moved by the link in one direction differs from the extent of movement effected by an equal movement of the link in another direction, the links being related to control and accommodate the angular and torsional vibratory movements of the body, the torque movements moving the members in a direction giving the greater relative edgewise movement, the major portion of the element in action being preponderantly subjected to direct stress by thrusts lengthwise of the link.

24. In a mounting assembly a vibratory body adapted for overhung suspension on an upright support; a suspension attached to the body for supporting the body in overhung relation to such a support comprising a series of three or more links horizontally and vertically spaced converging toward each other, one end at least of each link being cushioned in an element of resilient material such as rubber operating between members with curved faces, the curves of the faces being developed and merged from cross axes, the radii from the curves developed from one axis being greater than the radii of the curves developed from the other axis, both axes being offset from the same side of the members, the link acting with said members effecting a relative edgewise movement of the members, the movement of the members in response to equal movements of the link in different directions differing in extent and with a consequent difference in resistance to such movements, the links being related to control and accommodate the angular and torsional vibratory movements of the body, the torsional movement being in the direction of the curve having the longer axis.

25. A sandwich mounting comprising members spaced apart, an element of resilient material such as rubber between the members, the major portions of the faces of the element facing in opposed alined directions normal to the general contour of the faces, and means laterally displaced from the members and subjected to movement in two directions generally parallel to the faces and connected with and actuating the members for relative movement, the relative movement being partly edgewise resisted by shear of the element and partly rocking resisted by direct stress of the element, the general contour of the faces in curvature or extent offering greater resistance to rocking in one direction than in the other.

26. A sandwich mounting having relatively movable units, one comprising an intermediate member and the other unit outer members, one at each side of, and spaced from, the intermediate member, resilient elements having substantially the same surface contours in the spaces between the members, and means laterally displaced from the members and subjected to movement in two directions generally parallel to the surface contours of the members and actuating the units relative to each other, the relative movement being partly edgewise resisted by shear of the elements and partly rocking resisted by direct stress of the elements, the surfaces of the members in curvature or extent being related to cause greater resistance to rocking in one direction than in the other.

27. In an overhung engine suspension of links around the torque axis of the engine converging toward each other from a support, a link including a sandwich mounting with spaced plates having opposed faces transverse to the link and respectively joined to opposite faces of an element of resilient material such as rubber, said resilient material having an extent less than a semi-circle in all directions and having free spaces at the peripheral edges thereof between the plates providing shear action of the resilient material when the link is moved relative to the support and edgewise of the plates in torsional and crosswise to the torsional directions, the opposite faces being substantially longer in the torsional direction than in a direction crosswise to the torsional direction whereby the stiffness in a torsional direction is substantially greater than in a direction crosswise to the torsional direction.

28. In an overhung engine suspension of links around the torque axis of the engine converging toward each other from a support, a link including a sandwich mounting with opposed faces transverse to the link and respectively joined to opposite faces of an element of resilient material such as rubber, the opposed faces being elongated in the direction of torsional vibration and being concave in a crosswise direction.

29. In an overhung engine suspension of links around the torque axis of the engine converging toward each other from a support, a link including a sandwich mounting with opposed faces transverse to the link and respectively joined to opposite faces of an element of resilient material such as rubber, the opposed faces being elongated and having a gradual curve in the direction of torsional vibration and being more sharply curved in a crosswise direction.

30. In an overhung engine suspension of links around the torque axis of the engine converging toward each other from a support, a link including a sandwich mounting with opposed faces transverse to the link and respectively joined to opposite faces of an element of resilient material such as rubber, the opposed faces being elongated in the direction of torsional vibration and being oppositely curved in the direction of torsional vibration and in a crosswise direction.

31. In an overhung engine suspension of links around the torque axis of the engine converging toward each other, a supporting ring around the torque axis of the engine, and sandwich mountings each having an element of resilient material such as rubber, said element having opposed faces transverse to the link and occupying less than a semicircle in all directions and having free spaces at the peripheral edges thereof between the faces providing for shear action of the element upon relative edgewise movement of the faces in torsional and crosswise to the torsional directions, one face overlying and fixed to the ring and the opposite face fixed to the link.

32. In an overhung engine suspension of links around the torque axis of the engine converging toward each other, a supporting ring around the torque axis of the engine, and sandwich mountings each having an element of resilient material such as rubber extending and elongated in the direction of torsional vibration said element having opposed faces transverse to the link and occupying less than a semi-circle in all directions and having free spaces at the peripheral edges thereof between the faces providing for shear action of the element upon relative edgewise movement of the faces in torsional and crosswise to the torsional directions, one face overlying and fixed to the ring and the opposite face fixed to the link.

HUGH C. LORD.

(References on following page)

REFERENCES CITED

The following references are of record in the file of this patent:

UNITED STATES PATENTS

| Number | Name | Date |
|---|---|---|
| 2,162,714 | Hamblin | June 20, 1939 |
| 2,241,408 | Lord | May 13, 1941 |
| 2,270,673 | Lord | Jan. 20, 1942 |
| 2,317,190 | Henshaw | Apr. 20, 1943 |
| 2,317,500 | Tyler | Apr. 27, 1943 |
| 2,342,577 | Gehman | Feb. 22, 1944 |
| 2,385,759 | Henshaw | Sept. 25, 1945 |

FOREIGN PATENTS

| Number | Country | Date |
|---|---|---|
| 493,328 | Great Britain | Oct. 6, 1928 |